July 15, 1952  T. C. FERGUSON  2,602,990
RADIATOR POSITIONER
Filed Aug. 5, 1947  3 Sheets-Sheet 1
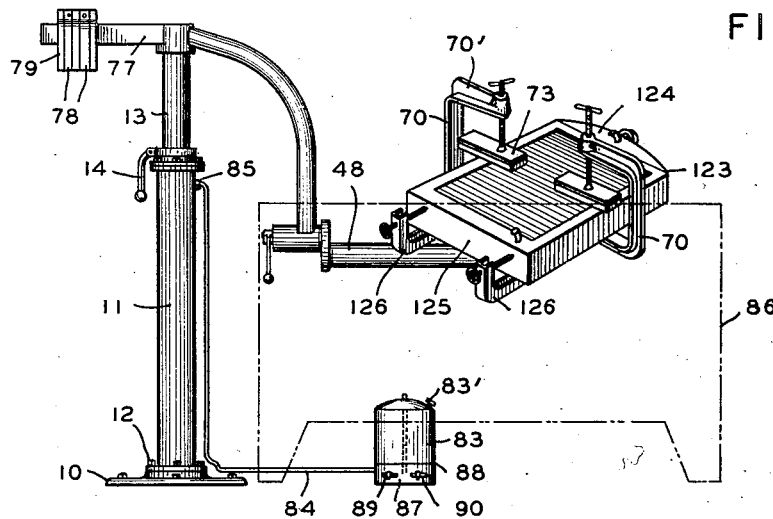
FIG. 1
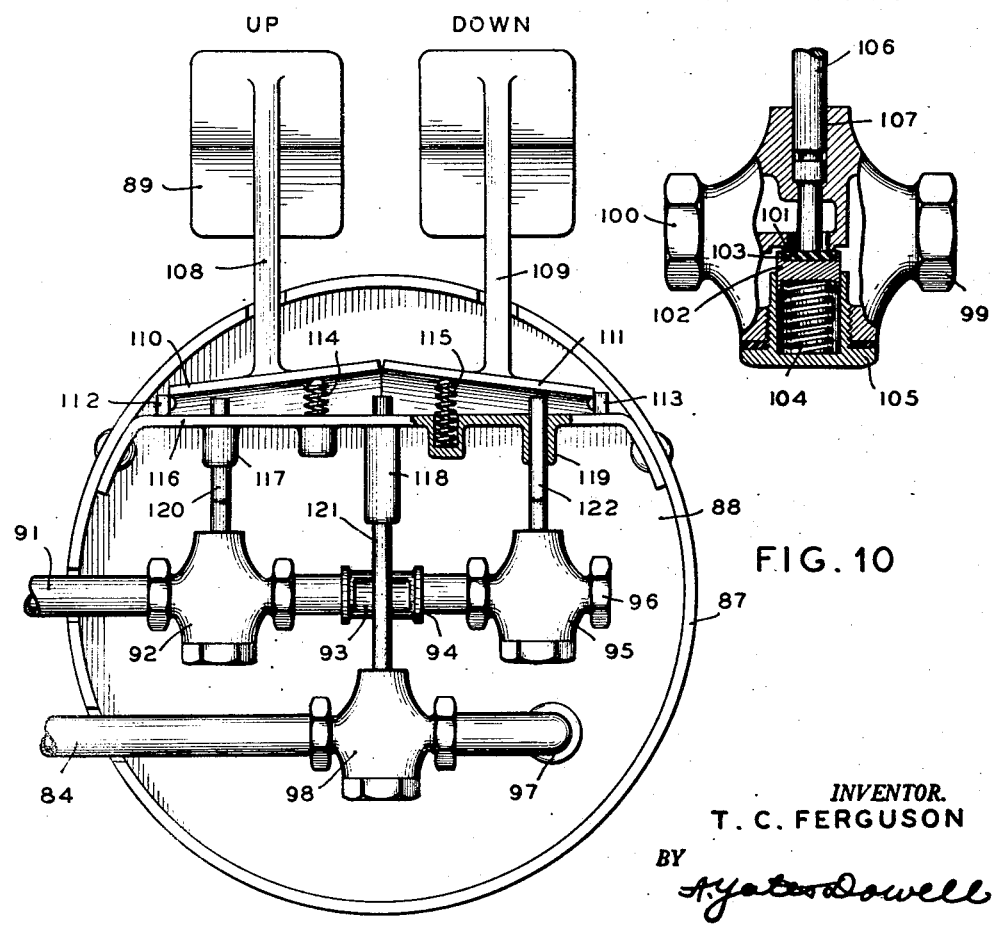
FIG. 11
FIG. 10
INVENTOR.
T. C. FERGUSON
BY
A. Yates Dowell
ATTORNEY July 15, 1952 T. C. FERGUSON 2,602,990
RADIATOR POSITIONER
Filed Aug. 5, 1947 3 Sheets-Sheet 2
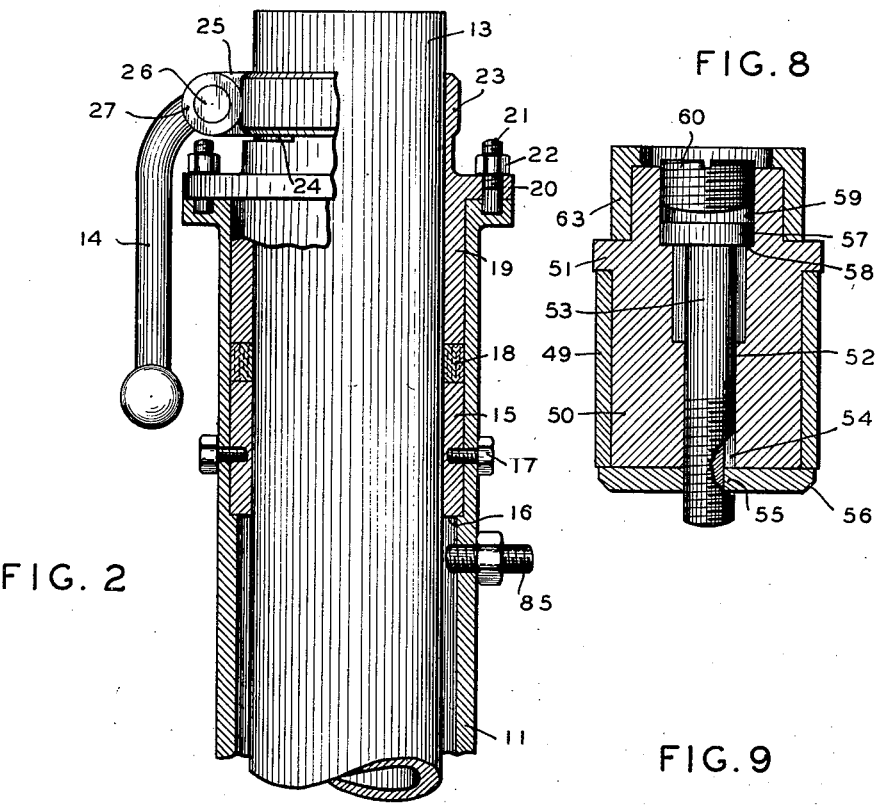
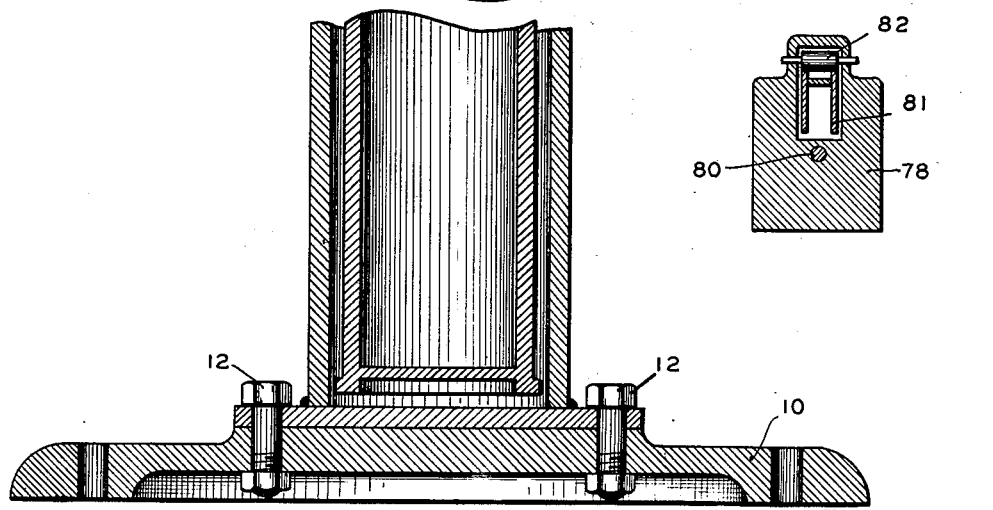
INVENTOR.
T. C. FERGUSON
BY
A. Yates Dowell
ATTORNEY

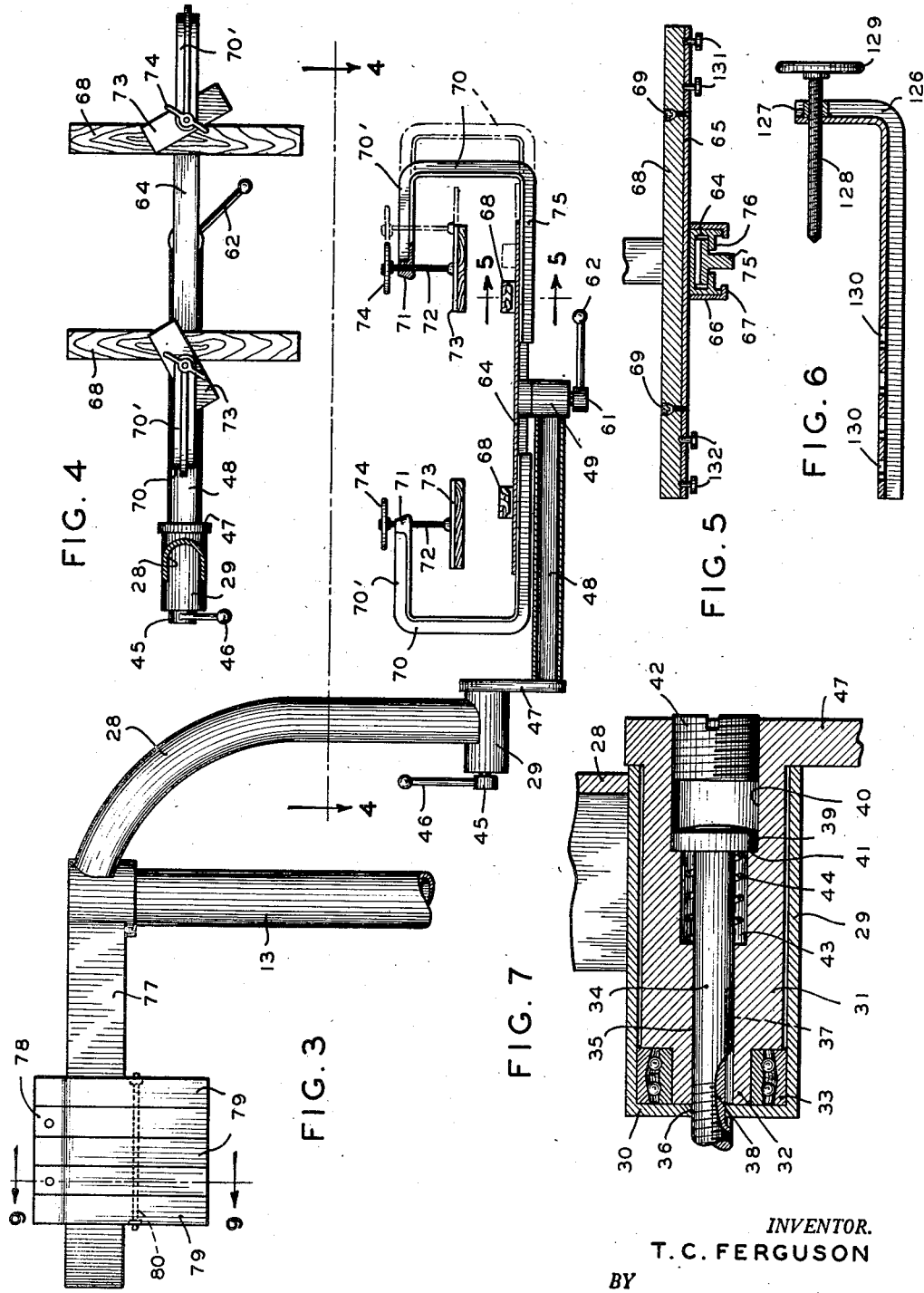

Patented July 15, 1952

2,602,990

UNITED STATES PATENT OFFICE 2,602,990

RADIATOR POSITIONER

Thomas C. Ferguson, Gainesville, Fla.

Application August 5, 1947, Serial No. 766,216

6 Claims. (Cl. 29—290)

This invention relates to work holders and more particularly to an apparatus for supporting automobile radiators or the like in any desired position of adjustment for facilitating repairs, testing or any other desired operations thereon and incorporating easily and accurately controlled power means for raising or lowering the radiator while clamped in the machine. This application is a continuation-in-part of my prior application Serial No. 681,081, filed July 2, 1946.

Radiators require repair work thereon for a variety of reasons, the most frequent being freezing, clogging due to an accumulation of scale, grease, or the like, and damage due to accidents. In the majority of cases in order to repair a radiator for any of the above causes, it is necessary to remove the radiator from the automobile in order to render the damaged part accessible.

Where it is only necessary to repair leaks caused by freezing or minor accident damage, this is usually accomplished by a soldering operation and since a soldering operation can be much more easily accomplished if the part to be soldered can be located below the soldering iron or torch so as to utilize the pull of gravity in directing the molten solder into the joint or leak, it is very advantageous to be able to support and locate the radiator in any desired position of adjustment.

In the cleaning of radiators necessitated by clogging thereof with an accumulation of scale, dirt, grease, or the like, it is frequently necessary to remove either the upper or bottom tank of the radiators and clean out each tube individually by running a rod of the proper size therethrough. Once again it can be appreciated that this operation could be carried out much more expeditiously if the radiator could be supported and held in a position convenient to the operator.

The testing of radiators after repair thereof is normally carried out by immersing the radiator in a tank or tube of water applying air pressure thereto and marking the points at which any air bubbles may appear thereby indicating a leak. It is extremely advantageous to perform the testing operation without removing the radiator from the repair stand since if further leaks develop these may then be repaired without loss of time occasioned by removing and reinstalling the radiator in the repair stand.

Automobile radiators are notoriously awkward and hard to handle due to their weight, size, shape, and the presence of many sharp corners and protuberances which endanger the hands and body of the operator to such an extent that any undue handling of the radiator should be avoided from the standpoint of safety, even though no consideration be given to the saving of time due to a minimum of handling.

Heretofore a good many radiator stands have been developed and patented but these have failed to achieve any great commercial success in that they fail to combine in one apparatus the features necessary for an efficient and easily usable repair stand as enumerated above, and further in view of the fact that these prior art devices are large and cumbersome and were not designed with a view to facilitating all of the necessary operations connected with radiator repair work.

It is therefore an object of this invention to provide a radiator positioner designed to support and clamp a radiator therein without damage thereto and to provide universally adjustable mechanism whereby the radiator may be supported in any desired position to facilitate repairs, testing or any other desired operation.

A further object of this invention resides in the provision of a radiator positioner in which the radiator may be supported in any desired position and in which vertical movement of the radiator is accomplished by a convenient and accurately controlled power means for raising or lowering the radiator in any increments desired.

A further object of this invention is the provision of a radiator positioning stand in which the vertical movement of the radiator is produced by hydraulic pressure resulting from the application of high pressure air to fluid within a storage tank, there being control means on the tank positioned for convenient actuation by the operator.

A further object of this invention resides in the provision of novel control means for accurately controlling vertical movement of the radiator.

A still further object of this invention resides in the provision of a radiator positioner having a radiator supporting cradle constructed and arranged for movement about a horizontal axis and for movement about an axis at right angles thereto and in which the center of mass of the radiator and cradle is substantially in the plane of the horizontal axis.

A further object of this invention resides in the provision of a radiator positioner having a radiator supporting cradle and in which the cradle is provided with novel clamping means for securing the radiator therein and with additional adjustable clamping means for holding various parts of a radiator in position while being secured in place.

Further objects and advantages of the invention will be apparent from the following description taken in conjunction with the accompanying drawings, wherein:

Fig. 1 is an elevational view of the radiator positioner of this invention showing a radiator clamped in position for repair work thereon and showing in phantom a tank for testing such radiator for leaks;

Fig. 2 is an elevational view partially in section showing the internal structure of the supporting column, piston, packing and clamping means for the piston;

Fig. 3, a partial elevational view with parts in section for greater clarity and showing the particular arrangement of the radiator supporting cradle and its manner of attachment to the piston;

Fig. 4, a plan view partially in section on the line 4—4 of Fig. 3 showing the details of the supporting cradle;

Fig. 5, a sectional elevational view on the line 5—5 of Fig. 3 showing the details of the radiator supporting bar and its manner of attachment to the cradle;

Fig. 6, a sectional elevational view showing the details of a clamping means which may be utilized for special operations;

Fig. 7, an elevational sectional view showing the manner in which the radiator supporting cradle structure is rotatably secured to the piston and the clamping means for holding the cradle in adjusted position;

Fig. 8, a sectional elevational view showing the manner of attachment of the cradle to a horizontal tubular member and with clamping means for securing the cradle in adjusted position;

Fig. 9, an elevational sectional view on the line 9—9 of Fig. 3 and showing the details of the counter weight and its manner of application;

Fig. 10, a bottom plan view of the hydraulic fluid pressure tank, the control valves and the means for operation thereof; and, Fig. 11, a detailed elevational view partially in section of one of the valves shown in Fig. 10.

Referring to the drawings there is shown in Fig. 1 a radiator positioner having a base 10, an upstanding tubular supporting column 11 secured to said base by bolts 12 or the like, and a piston 13 slidably and rotatably received within the supporting column 11 and which piston may be clamped in any position of adjustment by actuation of a clamping handle 14.

Internally of the supporting column 11 there is provided a guide bushing 15 resting on a shoulder 16 and secured therein by cap screws 17. The internal surface of the guide bushing 15 is accurately machined to closely fit the external surface of the piston 13. Immediately above the guide bushing 15 there is located a packing means 18 which may be of any desired type and which is adapted to engage the piston surface and prevent leakage of fluid from within the column 11 which forms a cylinder.

A packing gland 19 provided with a flange 20 is received within the column 11 and engages the top of the packing 18 to compress the same into fluid tight engagement with the piston, the gland 19 being held in position by stud bolts 21 and nuts 22 engaging the flange 20.

The portion of the gland 19 above the flange 20 is provided with means to clamp the piston 13 in any desired position of adjustment, this means comprising an enlarged ring shaped portion 23 integral with said gland and having a vertical slot therethrough as well as a horizontal slot 24 adjacent the lower edge of said ring, this slot 24 extending inwardly a sufficient distance to permit expansion and contraction of the ring. There are also provided apertured ears 25 located on each side of the vertical slot and in order to control the internal diameter of the clamping ring there is provided a bolt 26 fixed in one of the ears and extending through the other of said ears in slidable relation thereto. On the end of the bolt 26 there is threadedly received a clamping nut 27 having an actuating handle 14 thereon whereby upon movement of this handle the clamping ring 23 will be contracted or expanded as the case may be.

Secured to the top of the piston 13 as by welding or the like is a laterally and downwardly extending supporting arm 28 which may conveniently be of channel shape. Fixed to the lower end of the arm 28 is a tubular shaft and bearing receiving member 29 having one end thereof closed as at 30. The member 29 extends in a horizontal direction at right angles to the arm 28 and serves to receive a stub shaft 31 provided with a reduced portion 32 on which is mounted an anti-friction bearing 33. The bearing 33 is received within the member 29 with a press fit in order that the stub shaft 31 may be adequately supported and yet allow free rotational movement thereof within the member 29.

In order to clamp the stub shaft 31 in any desired angular position of adjustment there is provided a bolt 34 extending through a bore 35 in the shaft and through an opening 36 in the end wall 30 of the member 29. A key way 37 is provided in the bolt which is engaged by a key 38 provided in the opening 36 in order to prevent relative rotational movement between the bolt 34 and the member 29. The head 39 of the bolt 34 is received within a bore 40 providing a shoulder 41 against which the bolt head 39 is adapted to bear, the bore 40 being conveniently closed against the entrance of dirt or the like by a screw threaded plug 42. There is also provided a bore 43 of reduced size in which is received a compression spring 44 which tends to move the bolt head 39 away from the shoulder 41, thus assisting in unclamping the stub shaft 31 to permit free rotary movement thereof.

In order to accomplish clamping of the shaft 31 there is threadedly received on the bolt 34 a clamping nut 45 having an actuating handle 46 whereby upon movement thereof the bolt head 39 is drawn against the shoulder 41 to tightly clamp the shaft 31 in adjusted position and whereby upon movement of the handle 46 in the opposite direction the spring 44 will move the bolt head 39 away from the shoulder 41 to allow free movement of the shaft 31.

Integral with the shaft 31 is a supporting arm or bracket 47 extending at right angles thereto to the extremity of which is attached by welding or the like a tubular member 48. The member 48 extends in a horizontal plane at right angles to the bracket 47 and is provided at its outer extremity with a hollow sleeve 49 which serves to rotatably receive member 50 provided with a shoulder 51 engaging the top of the sleeve 49. The member 50 is provided with a bore 52 slidably receiving a clamping bolt 53 provided with a key way 54 engaged by a key 55 in a washer 56. This washer engages the end of the sleeve 49 opposite that engaged by shoulder 51.

The bolt 53 is provided with a head 57 which bears against a shoulder 58 provided by the bore 59. The bore 59 may conveniently be closed against the entrance of fluid, dirt or the like by a screw threaded plug 60. A clamping nut 61 having an actuating handle 62 is threadedly received on the bolt 53 and may be actuated to clamp the member 50 in any desired position of angular adjustment or may be released to permit rotation thereof.

Secured to a reduced portion of the member 50 as by welding or the like is a sleeve 63 to which may be attached by welding a channel shaped radiator supporting bar 64, this bar extending on both sides of the member 50 and at right angles to the axis thereof. The bar 64 serves to receive a pair of radiator engaging members each comprising a plate 65 having a downwardly extending channel 66 provided with flanges 67 which engage under the lower edge of the channel forming the bar 64 and which permit relative sliding movement between the plates 65 and the bar in order that the plates 65 may be positioned to properly engage various sized radiators. In order that the radiator core will not be damaged the top surfaces of the plates 65 are provided with wood blocks 68 which are adapted to engage the core of a radiator thus providing a relatively soft surface which will prevent damage thereto even though the radiator may be tightly clamped thereagainst. The blocks 68 may be conveniently secured to the plates 65 by means of countersunk screws 69.

In order to securely clamp a radiator in place on the blocks 68 there are provided a pair of C clamps 70. In one leg 70' of each clamp there is a screw-threaded aperture 71 in which is threadedly received a clamping screw 72 terminating in a clamping plate 73. An operating handle 74 is attached at the outer end of the clamp screw 72 in order to conveniently advance and retract the clamping plates 73.

The C clamps 70 are adjustably mounted on the bar 64 in order to permit adjustment thereof to accommodate various sized radiators. In order to permit this adjustment the leg 75 of each of the C clamps is slidably received within the channel of the cradle 64 and this channel is provided with inwardly extending portions 76 which engage the lower surface of the leg 75 in order to prevent any rocking motion thereof relative to the bar 64.

It will thus be understood that in order to adapt the apparatus to any sized radiator within the limits thereof it is only necessary to position the blocks 68 at the desired locations and to move the C clamps in or out so that the clamping plates 63 are in the proper position to clamp the radiator in place, it being noted that no means is necessary to secure the C clamps in adjusted relation to the bar 64 since the friction between the leg 75 and the channel of the bar 64 is sufficient to maintain the two clamps in position.

It will be seen that the radiator support constitutes a supporting cradle for the radiator and that the clamps extend upwardly so that the cradle may be positioned closely adjacent the tubular member 48. This allows the radiator to be submerged in a testing tank with either side up. It will also be observed that the radiator is substantially balanced about the horizontal axis of bearing sleeve member 29.

Since the radiator clamped on the bar 64 and the supporting structure are of substantial weight and further in view of the fact that these are attached to the piston 13 by a rather long arm, there is provided a counterweight arranged in such a manner as to offset the weight of the radiator and cradle which would tend to bend the piston 13 and prevent free vertical movement thereof within the column 11. This counterweight is conveniently provided by a channel-shaped beam 77 secured to the top of the piston 13 as by welding or the like, extending horizontally and in a direction opposite to that of the laterally and downwardly extending arm 28. Slidably mounted on the beam 77 is a weight 78 composed of a plurality of sections 79 secured together by a through bolt 80. Any number of sections 79 may be used in order to obtain the correct weight. Each section is provided with an opening 81 to receive the beam 77 and certain of the sections 79 are provided with rollers 82 journalled therein which engage the top of the beam to facilitate adjustment of the weight 78. No clamping means is required to maintain this weight in position since the beam 77 is in a horizontal position at all times and friction between the beam and the weight 78 is sufficient to maintain the desired location.

Hydraulic pressure for operating this device and causing upward movement of the piston 13 to position the radiator at any desired elevation is provided by a hydraulic pressure tank 83 communicating with the interior of the column 11 through a conduit 84 and a fitting 85 secured in the wall of the column 11. The tank 83 on which are mounted means for controlling the vertical movement of the piston 13 may be located at any position convenient to the operator which of course would usually be adjacent the location where repair work was to be done and also adjacent a testing tank 86. A filler opening normally closed by an airtight screw-threaded plug 83' is located in the top of the tank 83.

The tank 83 is of sufficient capacity to retain enough hydraulic fluid such as oil, hydraulic brake fluid, or the like to raise the piston 13 to its uppermost position and still retain a fluid reserve sufficient to compensate for any small leakage which may take place in the system.

The tank 83 is provided with an upper portion in which the fluid is retained and a lower skirt portion 87 which supports the bottom of the tank 88 spaced above the surface on which the tank rests. Within the space provided below the bottom 88 and enclosed by the skirt 87 there is provided a novel control means for governing the introduction of air pressure into the tank 83, for governing the flow of fluid from the tank to the column 11 and the return flow from the column 11 to the tank, as well as an air outlet valve for exhausting air pressure from the tank. These valves are operated by two pedals 89 and 90 which respectively control upward and downward movement of the piston 13. High pressure air is supplied to the tank through a pipe or conduit 91 in which there is positioned a control valve 92, the outlet of the valve 92 terminating in a T fitting 93. The opposite connection 94 of the fitting connected to an air outlet valve 95, the outlet 96 thereof being open to the atmosphere. The third connection of the fitting 93 is connected to a pipe which extends upwardly into the tank 83 to a point adjacent the top thereof and is in communication with the interior of the tank at this point, above the surface of the fluid.

The tank is further provided with a hydraulic fluid inlet and outlet 97 to which is connected a control valve 98, the outlet of this control valve being connected to the conduit 84 which supplies fluid to the column 11.

The valves 92, 95 and 98 are identical in construction, the internal arrangement of which is shown in detail in Fig. 11 and in which the inlet is indicated at 99 and the outlet at 100. Within the valve body there is provided a valve seat 101 and a valve member 102 having a packing 103 thereon for engagement with the seat. The valve member 102 and packing 103 are normally held in contact with the seat 101 by a spring 104. Closure plug 105 is screw threadedly received in the valve body and provides access for cleaning, repairing, etc. A valve actuating stem or rod 106 is slidably received in a bore 107 and contacts the top of the valve member 103 in such a manner that upon inward movement of the valve stem 106 the valve 103 is depressed and moved away from the seat 101 in order to allow flow of fluid therethrough. It will be noted that fluid flowing into the valve through inlet 99 will tend to exert a pressure on the valve in such a manner as to hold the same against its seat which will insure against the valve opening if excess pressure should accidentally be applied thereto.

Since the control valves 92, 95 and 98 must be actuated in a certain manner in order to obtain proper operation of the device, there is provided a novel actuating means for these valves. Two pedals 89 and 90 are provided with shank members 108 and 109 respectively which terminate in angularly disposed plate members 110 and 111 respectively. These plate members are pivotally mounted at 112 and 113 respectively. The pedals 89 and 90 are normally held in their upward position by springs 114 and 115 disposed between the plates 110 and 111 respectively and a cross member 116 disposed between opposite walls of the skirt 87.

The cross member 116 is also provided with apertured guides 117, 118, and 119 slidably receiving valve actuating rods 120, 121 and 122 which actuate the valves 92, 98 and 95 respectively.

In operation, assuming the piston 13 to be in its lowermost position, the pedal 89 is depressed causing the angular plate 110 to contact the valve actuating rod 120, thus opening the valve 92 and allowing high pressure air from the conduit 91 to enter the tank through T connection 93. This operation merely causes pressure to be built up within the tank and if the pedal 89 is not depressed further then no movement of the piston 13 will take place. Further downward movement of the pedal 89, however, will cause the angular plate 110 to engage the valve actuating rod 121, thus opening the valve 98 which will permit hydraulic fluid to flow from the tank 83 under the action of air pressure therein through the conduit 84 and into the column 11, thus forcing the piston 13 upwardly. It is to be noted that valve 92 remains open during flow of fluid from the tank.

It is apparent that by this means the operation of the piston will be very smooth and continuous and under the complete control of the operator, whereas if the fluid control valve 98 were to be opened first and air pressure subsequently introduced into the tank, movement of the piston 13 would be jerky and more or less uncontrolled, since air is a compressible fluid which would tend to build up to a high pressure within the tank 83 before movement of the piston 13 commenced and then as the air expanded cause a faster or jerky movement of the piston.

It has been found, however, that with the present control system very even and smooth movement of the piston is accomplished and this movement may be started or stopped instantly.

When it is desired to lower the piston 13, the pedal 90 is depressed and as will be seen from an inspection of Fig. 10, the angle plate 111 will first contact the valve actuating rod 122 to open the valve 95, thus exhausting air from the tank 83 through the T 93, connection 94 and outlet 96. If downward movement of the pedal 90 is stopped at this point the air in the tank will be merely exhausted therefrom and no movement of the piston 13 will take place. However, if downward movement of the pedal 90 is continued the angle plate 111 will contact valve actuating rod 121 to open the valve 98 thus permitting hydraulic fluid in the column 11 and conduit 84 to bleed back through connection 97 into the tank 83, thus allowing the piston 13 to move downwardly under the action of gravity. This movement is smooth and without jerks and is entirely under the control of the operator since downward movement of the piston 13 will stop immediately upon closing of the valve 98 as the hydraulic fluid is substantially incompressible. It is therefore apparent that downward movement of the piston 13 cannot take place until the air pressure in tank 83 is reduced and consequently no compression of this air by the returning fluid is possible which results in the smooth downward movement of the piston 13 as noted above.

As best shown in Fig. 1, a radiator 123 may be securely held in place by clamps 70 and this radiator may be positioned at any point convenient to the operator for repair work thereon by this cleaning, soldering or for any other desired purpose and once these operations are complete the radiator may be removed or may be lowered into the testing tank 86 by operation of the pedal controls on the tank 83.

It is in the testing operation that the real utility of the power operated raising and lowering mechanism is realized and in this operation the raising mechanism is actuated until the radiator now clamped in a horizontal plane is in a position to clear the top of the testing tank 86. The radiator and supporting arm 28 are then swung about the supporting column 11 to a position over the top of the testing tank and the lowering mechanism is actuated to lower the radiator into the tank. The testing of the radiator is accomplished by introducing air pressure to the inside thereof and checking for leaks by observing any bubbles which may issue from the radiator.

The operation of checking for leaks is quite critical, particularly when the leak is located near the inner portion of the core, since the points from which the bubbles issue cannot be seen. It is therefore the custom to determine the exact location of the leak by slowly raising and lowering the radiator in the water and noting the point at which the sound of the escaping air changes when the leak breaks water. It can therefore be seen that herein lies the great advantage of providing a raising and lowering mechanism which can be conveniently and accurately controlled to raise and lower the radiator in very small increments and provide substantially instantaneous stopping.

In the event it is desired to disassemble the upper or lower tanks 124 and 125 respectively of the radiator 123 and to replace these tanks or if there is other structure such as radiator shells and the like to be positioned around the radiator and secured thereto there are provided special clamps 126 for this purpose. These clamps are shown in operation in Fig. 1 and in detail in Fig. 6. Clamps 126 are formed from an L-shaped channel member, the short leg of the L being provided with a screw threaded aperture 127 in which is threadedly received a clamp screw 128 on the outer end of which is mounted an actuating handle 129. The longer leg of the L-shaped clamping member is provided with a series of key hole slots 130 which are adapted to removably engage rivets 131 and 132 located on each end of the radiator supporting plates 65. The clamps 126 may be adjustably positioned by means of these key hole slots in such a manner that any conventional sized radiator tank or shell may be engaged by the end of the clamp screw 128 to hold these parts in position while being permanently secured in place. It will be apparent that the provision of these clamps greatly facilitates the assembly and disassembly of radiators and their components in order to effect the complete and rapid repair thereof.

It will thus be understood that there is provided by this invention a radiator positioner for holding and locating a radiator in any desired position to facilitate the repair thereof in a manner most convenient and advantageous to the particular operation being performed and further to provide for the simple and effective checking of the radiator for leaks.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A radiator positioner comprising in combination a base, an upstanding tubular supporting column secured to said base, a guide bushing fixed in said column adjacent the top thereof, packing means received in said column above said bushing, a packing gland received in said column above said packing and having a flange secured to the top of said column, a split clamping ring above said flange and integral with said gland, an elongated piston slidably and rotatably received within said guide bushing, packing and clamping ring, apertured radially extending ears on said ring one on each side of and adjacent said split, a threaded bolt fixed in the aperture of one of said ears and extending through and freely slidable in the other aperture, a clamping nut threadedly received on said bolt, an actuating handle on said nut whereby upon operation thereof said ring may be contracted to clamp said piston or allowed to expand to permit movement of said piston, a hydraulic pressure supply tank, an air pressure inlet to said tank, a control valve in said inlet, an air outlet in said tank, a control valve in said outlet, a hydraulic fluid inlet and outlet in said tank having a control valve and communicating with the interior of said supporting column through a conduit, a first foot pedal mounted on said tank constructed and arranged whereby upon partial movement thereof said air inlet valve will be opened permitting the entrance of air under pressure to said tank and whereby upon further movement of said pedal said air inlet valve will remain open and said hydraulic fluid control valve will be opened permitting the flow of fluid under pressure and under control of said valve from said tank to the interior of said column, thus causing upward movement of said piston, a second foot pedal mounted on said tank constructed and arranged whereby upon partial movement thereof said air outlet valve will be opened to reduce the air pressure in said tank and whereby upon further movement of said second pedal said hydraulic fluid control valve will be opened to permit the flow of fluid from said column to said tank thus allowing said piston to move downwardly under the action of gravity, a laterally and downwardly extending supporting arm secured at one end to said piston adjacent the top thereof, a radiator support rotatably mounted on the lower end of said downwardly extending arm said radiator support being rotatable about a horizontal axis and about an axis at right angles to the horizontal axis, clamp means extending upwardly from said radiator support for retaining a radiator on said radiator support, a beam secured to the top of said piston and extending horizontally and opposite to the direction of said laterally and downwardly extending supporting arm and a counterweight slidably received on said beam whereby upon proper adjustment thereof the weight of the radiator and support is balanced, thus preventing undue strain on said piston.

2. A radiator positioner comprising in combination a base, an upstanding tubular supporting column secured to said base, an elongated bearing in the upper end of said column, an elongated piston rotatably and slidably received in said bearing and column, means for clamping said piston in adjusted position, a hydraulic pressure supply tank, a hydraulic fluid conduit from said tank to the interior of said column, control means on said tank for controlling upward and downward movement of said piston under the action of hydraulic pressure, a laterally and downwardly extending supporting arm secured at one end to said piston adjacent the top thereof, a sleeve secured to the lower end of said supporting arm and extending horizontally, a stub shaft journalled in said sleeve in anti-friction bearings, a bracket member secured to said shaft and extending transversely thereto, a horizontal member secured to said bracket and extending substantially parallel to and offset from said stub shaft, a radiator support rotatably mounted at the end of said member for rotation about an axis at right angles thereto, a plurality of radiator engaging clamps extending upwardly from said radiator support for retaining a radiator thereon and allowing free rotation of said radiator support, locking means associated with said radiator support and said tubular supporting member whereby said radiator support may be locked in any angular position of adjustment about an axis at right angles to said member, locking means associated with said stub shaft and sleeve whereby said radiator support may be locked in any angular position of adjustment about the horizontal axis, a beam secured to the top of said piston and extending horizontally and opposite to the direction of said laterally and downwardly extending supporting arm and a counterweight slidably received on said beam whereby upon proper adjustment thereof the weight of the radiator and support is balanced thus preventing undue strain on the piston.

3. A radiator positioner comprising in combination a base, an upstanding tubular supporting column secured to said base, an elongated piston slidably and rotatably received within said column, hydraulic means to raise and lower said piston, a laterally and downwardly extending supporting arm secured at one end to said piston adjacent the top thereof, a sleeve secured to the lower end of said supporting arm and extending horizontally, a stub shaft journalled in said sleeve for rotation about the horizontal axis of said sleeve, a bracket member secured to said shaft and extending transversely thereto, a horizontal member secured to said bracket adjacent the end thereof and extending horizontally therefrom parallel to said axis of said sleeve and laterally offset therefrom, a radiator support mounted at the end of said member for rotation about an axis at right angles thereto, clamp means on said radiator support for securing a radiator thereto in all positions, said clamp means being so arranged as to allow complete rotation of said radiator support, locking means for securing said radiator support in any angular position of adjustment whereby repair and testing of said radiator is facilitated, said radiator support by reason of its offset mounting on said bracket serving to support a radiator with the center of mass thereof substantially in line with the axis of said stub shaft whereby said radiator and support will be in substantially static balance about said axis, thus preventing undesired rotation of said radiator and support under the action of gravity.

4. A radiator positioner comprising a laterally and downwardly extending supporting arm, a sleeve secured to the lower end of said supporting arm extending horizontally and at right angles thereto, a stub shaft journalled in said sleeve in anti-friction bearings, a bracket member secured to said shaft and extending at right angles thereto, a horizontal tubular member arranged in substantially parallel transverse offset relation to said shaft secured to said bracket adjacent the end thereof and extending at right angles thereto, a radiator support comprising a channel bar rotatably mounted at the end of said tubular member for rotation about an axis at right angles thereto, a plurality of radiator engaging support members slidably mounted on said channel bar and extending at right angles thereto, a plurality of radiator engaging clamp means slidably mounted within each end of said channel bar and providing clamping means whereby said radiator is clamped between said means and said radiator engaging support members, a plurality of additional clamping means detachably and adjustably secured to said radiator engaging support members adjacent each of the ends thereof, said additional clamping means being constructed and arranged to exert a clamping pressure transversely of the radiator whereby radiator parts may be held in engagement with said radiator during repair operations thereon, locking means for securing said radiator support in any angular position of adjustment whereby repair and testing of said radiator is facilitated, said radiator support by reason of its offset mounting on said bracket serving to support a radiator with the center of mass thereof substantially in the plane of the axis of said stub shaft whereby said radiator and support will be in substantially static balance about said axis, thus preventing undesired rotation of said radiator and support under the action of gravity.

5. A radiator positioner comprising a laterally and downwardly extending supporting arm, a sleeve secured to the lower end of said supporting arm extending horizontally, a stub shaft journalled to said sleeve in anti-friction bearings, a bracket member secured to said shaft and extending transversely thereto, a radiator support arranged in substantially parallel transversely offset relation to said shaft secured to said bracket member adjacent the end thereof, locking means associated with said stub shaft and horizontally extending sleeve whereby said radiator support may be locked in any angular position of adjustment about the horizontal axis, said locking means comprising a screw threaded bolt slidably received in a recess in said stub shaft and extending through the end wall of said sleeve, means on said end wall cooperating with means on said bolt to prevent relative rotation between said bolt and said sleeve, spring means within said recess normally urging said bolt in a direction away from said end wall, a locking nut and actuating handle threadedly received on said bolt and engaging the exterior of said end wall whereby upon actuation of said nut said stub shaft will be clamped against movement about its axis and whereby upon release of said nut said stub shaft will be free to rotate.

6. A radiator positioner comprising in combination a laterally and downwardly extending supporting arm, a horizontally extending sleeve secured to the lower end of said supporting arm extending horizontally, a stub shaft journalled in said sleeve, a bracket member secured to said shaft and extending transversely thereto, a horizontal member secured to said bracket adjacent the end thereof and extending substantially parallel to said stub shaft and laterally offset therefrom, a radiator support comprising a bar rotatably mounted at the end of said horizontal member for rotation about an axis at right angles thereto, a plurality of radiator engaging support members slidably mounted on said bar, a plurality of radiator engaging clamp means slidably mounted adjacent each end of said bar and providing clamping means whereby said radiator may be clamped between said means and said radiator engaging support members, a plurality of additional clamp means detachably and adjustably secured to said radiator engaging support members adjacent each of the ends thereof, said additional clamping means being constructed and arranged to exert a clamping pressure transversely of the radiator whereby radiator parts may be held in engagement with said radiator during repair operations thereon.

THOMAS C. FERGUSON.

REFERENCES CITED

The following references are of record in the file of this patent:

UNITED STATES PATENTS

| Number | Name | Date |
|--------|------|------|
| 1,321,310 | Jerden | Nov. 11, 1919 |
| 1,341,809 | Lee | June 1, 1920 |
| 1,432,725 | Nolting | Oct. 17, 1922 |
| 1,534,008 | Bongardt | Apr. 14, 1925 |
| 1,673,990 | O'Brien | June 19, 1928 |
| 1,732,081 | Clement | Oct. 15, 1929 |
| 1,778,563 | Peck | Oct. 14, 1930 |
| 1,823,204 | Long | Sept. 15, 1931 |
| 1,976,129 | Johnson | Oct. 9, 1934 |
| 2,187,283 | Scheutz | Jan. 16, 1940 |
| 2,359,249 | Scheer | Sept. 26, 1944 |
| 2,421,437 | Ryan | June 3, 1947 |
| 2,470,204 | Wishon | May 17, 1949 |